May 19, 1942.  R. H. SHADRICK  2,283,392
VARIABLE SPEED PULLEY
Filed Dec. 5, 1940  3 Sheets-Sheet 3
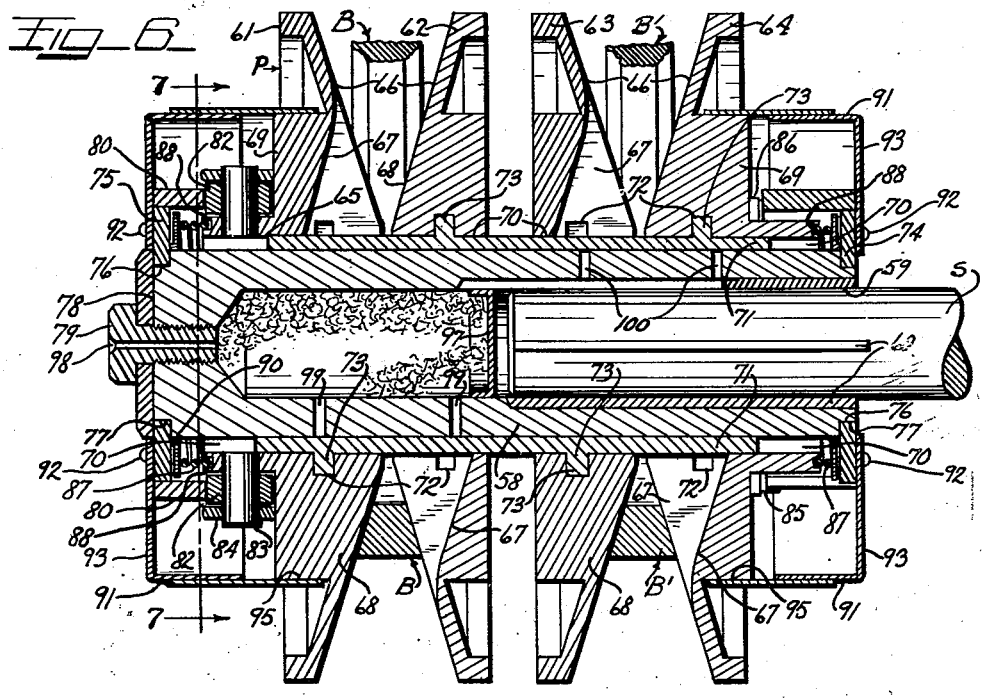
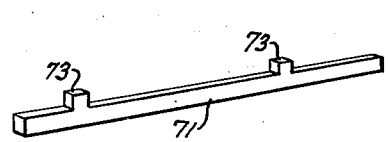
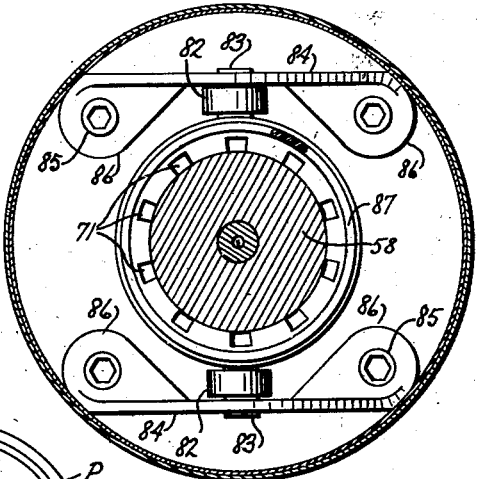
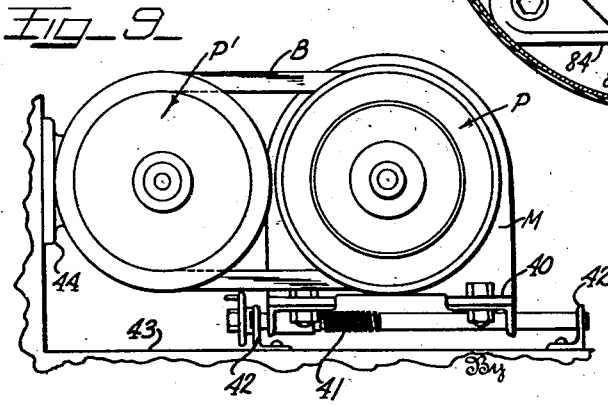
Inventor
RICHARD H. SHADRICK
By Carlsen & Hazle
Attorneys Patented May 19, 1942

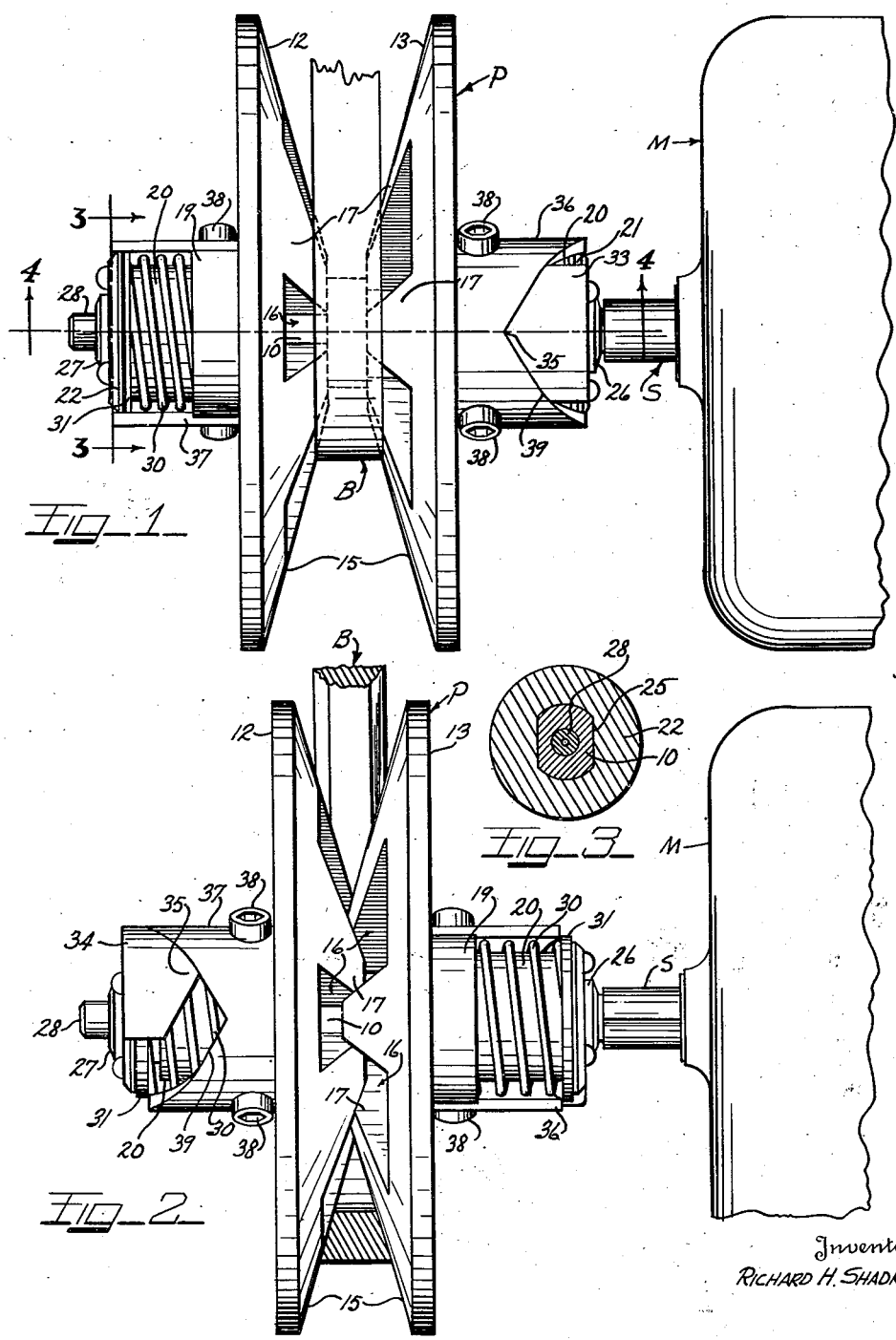

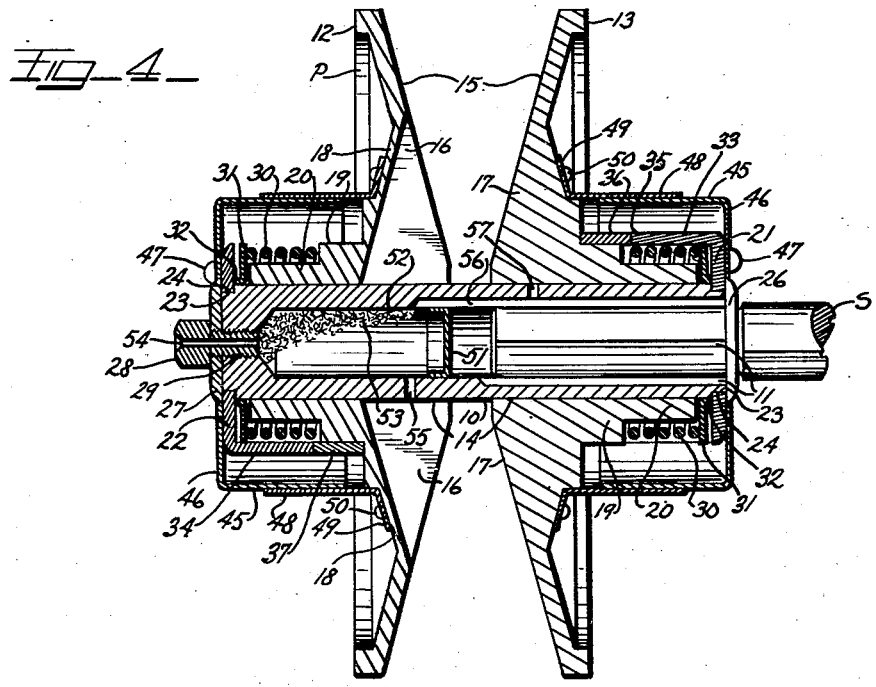
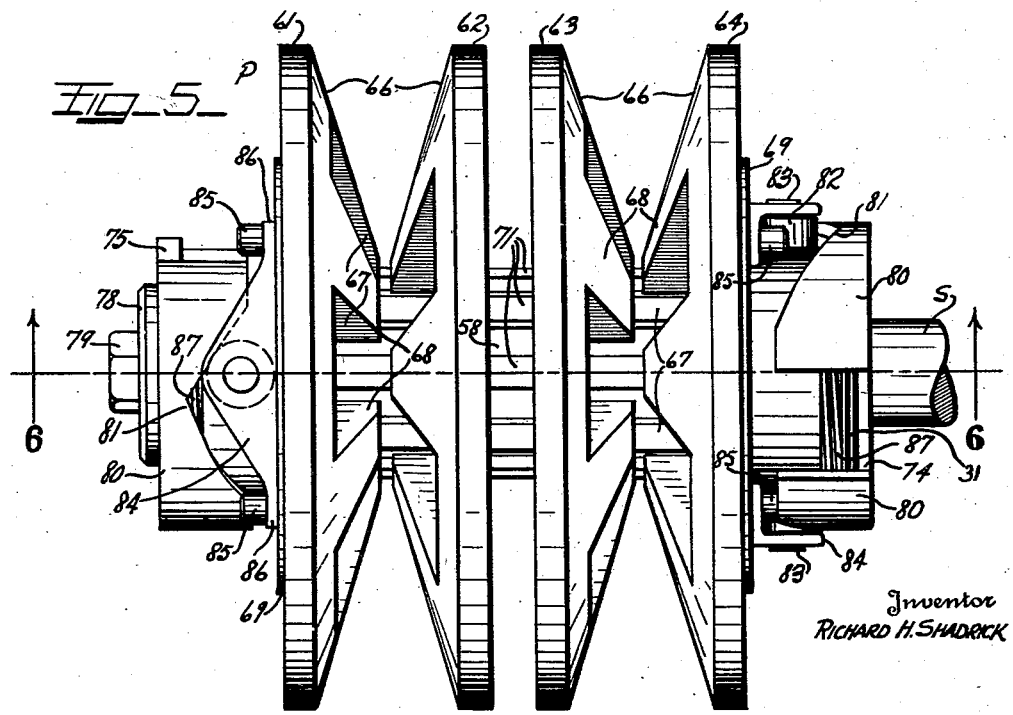

2,283,392

UNITED STATES PATENT OFFICE 2,283,392

VARIABLE SPEED PULLEY

Richard H. Shadrick, Minneapolis, Minn., assignor to F. L. Dryg, Minneapolis, Minn.

Application December 5, 1940, Serial No. 368,599

4 Claims. (Cl. 74—230.17)

This invention relates to improvements in variable speed power transmitting devices.

The primary objects of the invention is to provide a simple and effective means for varying the relative speeds as between the driving and driven elements of a power transmission apparatus. Another object is to provide means of this kind in the form of a belt pulley in which the effective belt diameter may be readily adjusted when in operation to thus vary and control the speed at which the pulley will operate the belt or, conversely, the speed at which the pulley is driven by the belt. Another object is to provide a device of this nature in which the effective belt diameter is variable in accordance with adjustable belt tension but in such manner that extraordinary strain or wear on the belt will be prevented. Still a further object is to provide a pulley of this kind in which cam operated cooperating belt groove forming members or disks are employed and shifted to vary the effective belt diameter and in which the operating means for adjusting the members are disposed near the hub of the pulley and fully enclosed in a compact, neat and effective manner.

These and other more detailed and specific objects will be disclosed in the course of the following specification, reference being had to the accompanying drawings, in which—

Fig. 1 is an edge or side elevation of a pulley constructed in accordance with my invention, showing the same as mounted on a motor (only fragmentally shown) and with the cooperating belt groove forming members spread widely apart to decrease the effective belt groove diameter.

Fig. 2 is a similar view but taken from the opposite edge or with the pulley rotated through one half revolution, and showing the pulley adjusted to a relatively large belt groove diameter.

Fig. 3 is a cross section along the line 3—3 in Fig. 1.

Fig. 4 is a longitudinal and diametrical section along the line 4—4 in Fig. 1, the belt being removed and this view also showing shrouds or end housings to conceal and protect the operating mechanism.

Fig. 5 is an elevation of a modified form of my invention showing a multiple pulley designed to accommodate two belts, the cooperating belt groove forming members being shown as in substantially a midpoint in their range of adjustment.

Fig. 6 is a longitudinal and diametrical section along the line 6—6 in Fig. 5, and showing shrouds or end housings over certain operating parts of the pulley.

Fig. 7 is a cross section along the line 7—7 in Fig. 6, with certain pulley parts broken away.

Fig. 8 is a detail in perspective of one of the keys used in connecting the belt groove forming members in the multiple pulley.

Fig. 9 is an elevation of one possible operating assembly of my variable speed pulley, belt, common pulley and motor and showing means for varying the belt tension.

Referring now more particularly and by reference characters to the drawings, M represents a conventional electric motor which is shown, for purposes of exemplification, as a driving means for my improved pulley P which is mounted upon the shaft S of the motor. It is to be understood, however, that my pulley may be used on any type of driving means and also that it may be a part of the driven mechanism instead of the driving mechanism, as here shown. A belt, of conventional V-belt stock, is also shown and is designated at B in the drawings.

In the form shown in Figs. 1 through 4, my pulley comprises a central sleeve 10, which is keyed as at 11 upon the end of the shaft S so that the hub will rotate with the shaft. Cooperating belt groove forming disks or members 12 and 13 are slidably and rotatably mounted on the sleeve 10, having central openings or bores 14 for this purpose, and inner or facing surfaces 15 of these disks are trunco-conical as shown so as to provide annular, sloping faces well adapted to receive and engage the sides of the V-shaped belt B. These facing surfaces 15 also have circumferentially spaced and angularly formed recesses 16 which extend outward radially from the openings 15 some distance and form therebetween the radial fingers 17 on the disks. The disks 12 and 13 are so located on the sleeve that the fingers 17 of one disk will align themselves with the recesses 16 in the other and thus the disks may be collapsed or moved together from the outspread positions (Fig. 1) to the more closely spaced positions (Fig. 2) with the fingers in interdigitating or interlacing engagement as clearly shown. Such shifting of the disks obviously varies the effective belt diameter, the widely spread position in Fig. 1 providing the smallest belt diameter and the closely spaced position of Fig. 2 a larger belt diameter and with intermediate positions proportionally varying this dimension.

The outer sides or surfaces 18 (Fig. 4) of the recesses 16 in each disk are angularly cut in planes parallel with the sloping inner surface of each opposite disks so that the fingers 17 may be completely received in the recesses when the disks are moved closely together to form the greatest possible belt diameter.

Outer faces of the disks 12 and 13 have oppositely extending hubs 19 which are diametrically reduced at their outer ends 20 and circular end plates 21 and 22 are secured to the ends of the sleeve and extend diametrically therefrom all around the circumference to thus limit outward spreading movement of the disks. The ends of the sleeve 10 are reduced as at 23 to receive and fit the central openings 24 of the plates 21—22 and both these reduced ends 23 and the openings 24 have flat sides or portions, shown at 25 in Fig. 3, to prevent the plates from turning on or with respect to the sleeve. One plate 21 (next to the motor M) is then held in place by a collar 26 secured on the shaft S (or by welding) while the other plate 22 is removably retained in place by a washer 27 which is secured by a cap screw 28 screwed into a tapped bore 29 in a closed end of the sleeve 10.

Expansion coil springs 30 are placed over the reduced ends or necks 20 of the disk hubs 19 and braced between the hubs and washer-like bearing rings 31 loosely fitted on the sleeve 10 outwardly of the hub ends. The springs thus normally and yieldably urge the disks 12 and 13 together, and act to some extent to center the disks between the ends of the sleeve 10, as well as carry out other desirable functions as will appear hereinafter. The bearing rings 31 have inner annular margins 32 turned outwardly to bear against the end plates 21 and 22 and thus reduce the frictional resistance to turning movement of the plates relative to the rings.

Cams or wedge shaped driving members 33 and 34 are secured, as by welding, to the margins of the end plates 21 and 22 and extend therefrom toward the respective disks 12 and 13, these cams having the points 35 and oppositely angled or sloping edges, and being arcuate as viewed from the end to fit the edges of the end plates on which edges they are supported in positions substantially in alignment with the peripheral surfaces of the hubs 19. Cam plates 36 and 37 are mounted, as by cap screws 38, on the hubs 19 and extend outwardly therefrom away from the disks and toward the cams 33 and 34, the said plates being also arcuate as viewed from the end to correspond to the curvature of the hubs and cams and having wide V-shaped cam notches in their outer or exposed edges as designated at 39. As here shown the respective cams and cam plates 33—36 and 34—37 are diametrically oppositely disposed with respect to axis of the pulley, but this, of course, is not mandatory. One cam and cam plate are also shown at each end of the pulley although, as a matter of fact, two of each of these elements may be used at each end if so desired.

The cams and cam plates are so arranged that the cams will enter and center themselves in the cam notches 39 when the disks 12 and 13 are spread apart or opened as shown in Fig. 1. Oscillation of the disks relative to the cams, in either direction, will then, through the angular leverage exerted by the angular sides or edges of the cams or the V-shaped notches, act to urge the disks inward, the movement imparted to each disk being of course equal.

In the operative assembly, as indicated in Fig. 9, the pulley P is arranged as described upon the shaft of the motor M and the belt B is passed over and through the belt groove formed between the disks 12 and 13 and over a conventional non-adjustable pulley P'. The motor M may then be carried by a base 40 upon a screw 41 which is held against axial displacement in brackets 42 secured to the base 43. By turning the screw 41 the motor and pulley P may thus be adjusted toward or away from the fixed support 44 for the pulley P' thus decreasing or increasing the distance between pulley centers. Such operation obviously will vary the tension on the belt B and cause a corresponding variation in the effective belt groove diameter of the pulley P, to thereby vary the relative rate or speed at which this pulley drives the belt and pulley P'. The manner in which this action occurs will presently appear. It has been noted heretofore that the adjustable pulley may be either the driving or driven element and it will further be apparent that, in lieu of an adjustment in the spacing between pulley centers, the required variation in belt tension may be secured in any other well known manner such as by an adjustable idler pulley (not shown) engaging one span or reach of the belt.

As heretofore stated the belt groove forming disks 12 and 13 are rotatable on the sleeve 10 but in operation the disks are rotated with this sleeve, and with shaft S of course, by the action of the cams 33—34 upon the respective cam plates 36—37, and these parts, constituting therefore the driving elements for the pulley, are maintained in contact by the resistance offered by the belt B as it runs between the disks. The springs 30 yieldably press the disks toward each other into lateral contact with the belt but aside from this action the springs act to assist in centering the disks and prevent any noise and vibration between the disks, cams, and such parts. However, the springs do not, and are not intended to, form any part of the power transmission between the pulley shaft and pulley disks, nor do these springs have any function as sole means for adjusting the disks and maintaining belt contact. To the contrary the springs only serve to establish initial belt contact, should the belt be loose in starting the pulley, and as soon as such contact is established the cams and cam plates transmit the motion to the belt causing it to travel with the pulley as a whole. Thereafter the lateral pressure on the belt will be directly proportional to the load as under ordinary circumstances, and it is thus to be seen that I have avoided the extraordinary and destructive wear on the belt caused by a constant and relatively great spring pressure on the disks as would be necessary were the springs used as driving means.

Assuming now that the belt is running over an effectively large belt groove diameter, as would be the case in Figs. 2 and 9, the spreading apart of the pulley centers, or an increase in belt tension brought about in any other way, will have a spreading effect on the disks 12 and 13, causing the cam notches 39 to move outwardly and receive a greater part of the cams 33 and 34, until the belt tension has again been equalized by the resistance between the cam edges. Such action may of course be carried out while the pulley is in operation and may be extended or continued to the point that the pulley will reach the minimum effective belt groove diameter condition with the disks spread or opened widely apart and the cams fully entered and centered in the notches 39. If the belt tension is now diminished, by a reversal of the aforesaid operation, the spreading resistance between the disks will be lessened and the cam edges will then permit a certain slippage or relative oscillation of the disks and cams so that the disks approach each other and the belt groove diameter increases until the cam resistance again is equalized by the belt resistance. The above actions may be carried out in either direction of rotation since the cams and cam notches each have pairs of oppositely angled cam edges for this very purpose. The action on each pulley disk being exactly the same, due to the opposite location and proper alignment of the cams, the disks will thus maintain proper positions for meshing or interlacing of the fingers 17, and this action of course will further maintain the disks in properly centered driving position upon the pulley sleeve.

The driving parts (cams and cam plates) as well as the springs 30 and bearing rings 31 may be enclosed and protected by end housings or shrouds as shown in Fig. 4. These shrouds each comprise outer cup-like members 45 which are secured by their annular inwardly turned lips 46 to the end plates 21 and 22 by means of screws 47. These members 45 telescopically engage and fit into slightly larger annular inner members 48 which are diametrically flanged at 49 and secured, as by screws 50, to outer sides of the belt groove forming disks 12 and 13. The members 45—48 of course clear the hubs 19, and they may freely rotate and telescope as the pulley parts operate in the manner described.

For the purpose of lubricating the parts I provide, as shown in Fig. 4, a flanged disk 51 which is forced through the open end of the bore 52 of the sleeve 10 to plug this bore but to leave at least a half of the length thereof open for the reception of the shaft S upon which the pulley is mounted. The space or chamber between this plug and the opposite closed end of the bore is then filled with an absorbent material 53 capable of a capillary action upon a lubricating oil which may be periodically entered into this chamber through an axially extended oiling passage 54 formed in the screw 26. A radially extended port 55 through the wall of the sleeve will carry oil from the chamber outwardly to the inner surfaces of the disk 12, and its hub 19, while one keyway for the keys 11 may be extended into the chamber, as indicated at 56, and another port 57 extended from the keyway outwardly to carry oil to the disk 13 and its hub. The centrifugal force set up in the operation of the pulley of course greatly facilitates the flow of the oil to these parts.

It will be noted that the end plates 21—22, cams 33—34, cam plates 36—37, bearing rings 31, and housing or shroud member 45—48, may all be pressed or formed from sheet metal and thus the manufacturing cost of the pulley is greatly reduced over a pulley using castings or machined parts for these purposes.

Referring now to Figs. 5 through 8, I have shown therein a multiple belt pulley designed to accommodate two belts B and B' although it is to be understood that the same constructional principles may be applied to a pulley for handling even a greater number of belts. Also certain details of the cams or driving means may also find use in the single pulley as heretofore fully described.

This multiple pulley comprises a central sleeve 58 which has a bore 59 opening through one end and which is keyed on the drive or operating shaft S as clearly shown at 60. Slidably and oscillatably mounted on this sleeve are the four cooperating belt groove forming disks or members 61, 62, 63, and 64, which have center openings 65 to freely receive the sleeve. The disks 61—63 and 62—64 are substantial duplicates and, as will appear, they are operated in unison with the disks of each pair facing the complementary disks of the other pair so that their conical faces 66 define the belt grooves for the belts B and B'. These faces 66 also have the radially extending and circumferentially spaced recesses 67 which define the fingers or spokes 68 adapted to interlace as the disks move together in exactly the manner previously described. The outermost disks 61—64 have the outwardly extended hubs 69 as clearly shown.

The disks have a series of circumferentially spaced grooves 70 extending longitudinally and parallel with the axes of the openings 65, and these grooves open into said openings to slidably receive and engage an equal number of connecting keys or strips 71 which are extended longitudinally, or endwise, on and spaced around the sleeves 58 and slidably and rotatably engage the same. Each disk further has an annular groove or recess 72 formed around the inner surface of the opening 65 and communicating with the several grooves 70. The keys 71 are each provided with a pair of spaced, outwardly turned lugs or projections 73 and the keys are so set up on the sleeve that the lugs 73 of alternate keys engage and fit into the grooves 72 of the respective pairs of disks 61—63 and 62—64. Thus the disks of each pair are connected by alternate keys and are held by the lugs 73 at fixed spacing relative to each other. However, the keys may slide freely through the grooves 70 so that the pairs of disks will move in unison and thus, by inward or outward movement of the outer disks 61 and 64 along the length of the sleeve, a corresponding closing or spreading action of the disk pairs toward and away from each other will take place and the effective belt groove diameter will be increased or decreased in accordance with such action.

Obviously the keys 71 may be extended and connected to additional disks where it is desired to make the pulley accommodate more than two belts.

End plates 74 and 75 are rigidly mounted at opposite ends of the sleeve 58 which has its ends reduced, as at 76, to fit center openings 77 in said end plates. The reduced ends 76 and openings 77 may have flat sides to prevent relative rotation of these parts in exactly the manner previously described. The end plate 74 may be rigidly anchored on the sleeve by welding or by a collar (not shown) on the shaft S while the other plate 75 is removably retained in place by a large washer 78 held by a screw 79 entered in the closed end of the sleeve, as clearly shown.

Cams or cam plates 80 are extended inward, in diametrically opposed pairs, from the end plates 74 and 75 and have the V-shaped cam notches 81 similar to the notches 39 in the cam plates 36—37 previously described. These cams are formed of sheet material and welded or otherwise secured and extended from the edges of the end plates, the cams being arcuate as viewed from the end to thus follow the curvature of the plates. As shown in the drawings, each cam of each pair is diametrically opposed to the other while the respective pairs of cams on opposite ends of the pulley are angularly disposed ninety degrees around the axis of the sleeve from each other.

Mounted on the hubs 69 are four rollers 82 which are arranged in diametrically opposed pairs, one pair on each hub, and which are journaled upon pins 83 extended outwardly from the hubs on radial axes. Bracket members 84 are secured by cap screws 85 to outer surfaces of the outer disks 61 and 64 and, extending outwardly therefrom overlie the rollers 82 and supportably engage outer ends of the pins 83. These bracket members 84 are pressed from sheet metal and formed with apertured ears 86 to receive the mounting screws 85. The rollers 82 are of course so supported that they will engage and roll against the faces or edges of the cam notches 81.

Expansion coil springs 87 are arranged over the sleeve 58 outwardly of the hubs 69 and at their inner ends are received in and braced against annular grooves 88 formed in end surfaces to the hubs. The outer ends of the springs bear against bearing rings 89 placed over the sleeve inwardly of the end plates 74—75 and these rings have friction reducing flanges 90. The springs 87 aid in centering the disks and prevent noise or vibration but, as hereinbefore pointed out in detail, they do not here either have any driving or power transmission functions.

In operation the belt groove diameters between the disks 61—62 and 63—64 may be varied as has been previously set out, the disks being spread or closed together by the cooperating engagement of the rollers 82 with the cam notches 81 for this purpose.

The cams, rollers, and springs are here again enclosed and concealed by end housings or shrouds comprising outer annular members 91 secured by screws 92 through their inwardly turned outer end flanges 93 to the end plates 74—75 and inner annular members 94 pressed at inner ends over annular shoulders 95 formed on the outer sides of the disks 61—64. The respective inner and outer shroud members of course are telescopically related to permit the necessary shifting movements of the disks.

A plug 97 is pressed into the bore 59 of the sleeve 58 inwardly of the shaft S and in the chamber thus formed between the plug and closed end of the bore an absorbent material is provided to hold oil received through the passage 98 formed axially through the screw 79. Ports 99 lead the oil outward to the disks 61—62 while other ports 100 lead the oil from one keyway, extended into the chamber, outwardly to the other disks 63—64.

It is apparent that the cam or driving means as thus described for the single and double pulleys may be interchanged, that is, the cams and cam plates of the single pulley used in lieu of the cams and rollers of the multiple pulley or vice versa. Such variations are considered to be within the scope of my invention.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A variable speed pulley comprising a central sleeve, a pair of trunco-conical disks movably mounted on the sleeve and cooperating to form a belt groove of variable diameter therebetween, end members secured rigidly to the sleeve, cam members supported by the disks and end members and cooperating to produce oblique driving contacts and adjust the disks on the sleeve in response to changes in belt tension and thereby increase or decrease the effective belt groove diameter, the said cam members establishing said driving contact in a line spaced radially outward from the sleeve and within the mean effective belt groove diameter, coil springs disposed around the sleeve and braced between the disks and the said end members to yieldably urge the disks away from the ends of the sleeve, bearing rings on the sleeve and engaging the springs, and the said rings having annular projections engaging the end members to space the rings therefrom.

2. A variable speed pulley comprising a central sleeve and circular end members secured rigidly to the ends thereof, a pair of cooperating trunco-conical belt groove forming disks mounted on the sleeve and having freedom for limited axial and turning movement with respect thereto, central hubs extended from the disks toward the said end members and having reduced outer end portions, cam members supported by the hubs and by the end members in outwardly and radially spaced positions relative to the reduced ends of the hubs, the said cam members having means establishing oblique driving contact between the sleeve and disks to produce the said axial and turning movements of the disks in response to changes in belt tension and thereby increase and decrease the effective belt groove diameter, springs coiled around the reduced ends of the hubs to turn with the disks and adapted to yieldably urge the disks inwardly away from the end members, and bearing rings having annular projections to engage the end members and turn freely with respect thereto, the said rings being braced against outer ends of the said springs.

3. A variable speed pulley comprising a central sleeve, pairs of trunco-conical belt groove forming disks having center openings by which they are mounted on the sleeve with freedom for limited axial movements with respect to the sleeve, the individual right and left hand disks of each pair having inclined cooperating belt groove forming surfaces, the said disks having grooves in the inner surfaces of their center openings and extending parallel with the axes of said opening, keys extending lengthwise along the sleeve through the said grooves and loosely engaging the surface of the sleeve, the said disks also having annular grooves in the inner surfaces of their center openings, lugs extending radially from the keys, the lugs on a part of the keys being extended into and anchored in the annular grooves of the right hand disk of each pair and the lugs of the remaining keys being correspondingly anchored in the annular grooves in the left hand disk of each pair, cam members mounted on the outermost disks, other cam members nonrotatably supported by the sleeve, and the said cam members having means for establishing oblique driving contacts between the sleeve and disks to adjust the disks of each pair axially on the sleeve in response to changes in belt tension and thereby increase and decrease the effective belt groove diameters formed between each pair of disks.

4. A variable speed pulley for mounting upon a central shaft and comprising, pairs of trunco-conical belt groove forming disks having center openings by which they are mounted upon the shaft with freedom for limited movements with respect thereto, the individual right and left hand disks of each pair having cooperating belt groove forming surfaces, keys extending lengthwise through the openings in the disks and movable with respect to the shaft in directions parallel with the axis thereof, the said disks having annular grooves in the walls of their center openings, lugs extending from the keys, the lugs on a part of the keys being engaged with the said grooves in the individual right hand disks of each pair and the lugs on other keys being similarly engaged with the grooves in the left hand disks of each pair, whereby said right hand disks and said left hand disks will operate in unison, and cam members operatively arranged for establishing oblique driving contact between the shaft and at least one right hand and one left hand disk to adjust the right and left hand disks of each pair with respect to each other and thereby increase and decrease the effective belt groove diameters formed between each pair of disks.

RICHARD H. SHADRICK.